S. COOK.
Cooling and Bolting Flour.

No. 8,786.  Patented March 9, 1852.

UNITED STATES PATENT OFFICE.

SAMUEL COOK, OF ADAMS BASIN, NEW YORK.

FLOUR-BOLT.

Specification of Letters Patent No. 8,786, dated March 9, 1852.

*To all whom it may concern:*

Be it known that I, SAMUEL COOK, of Adams Basin, in the county of Monroe and State of New York, have invented certain new and useful Improvements in Machines for Cooling and Bolting Flour; and I do hereby declare the following to be a full, clear, and exact description of the same, reference being had to the accompanying drawings, making a part thereof, in which—

Figure 1:
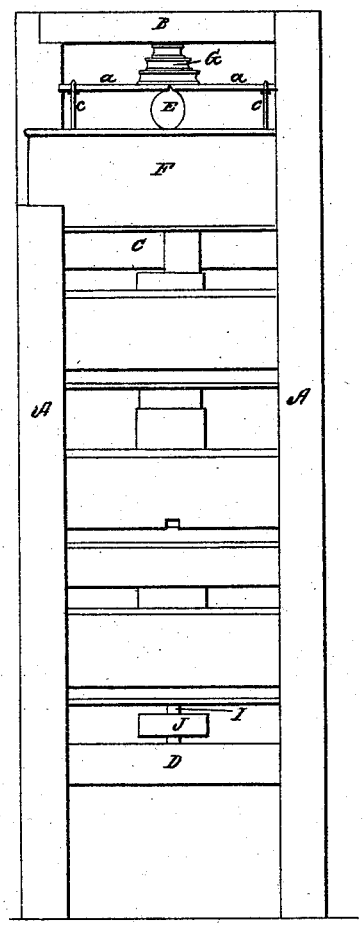
Figure 2:
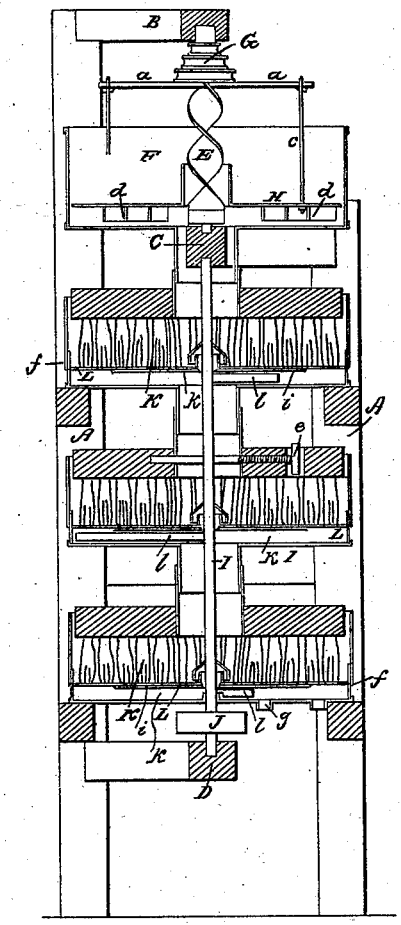
Figure 3:
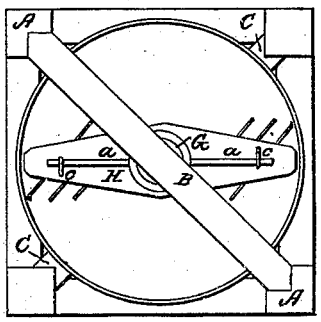
Figure 4:
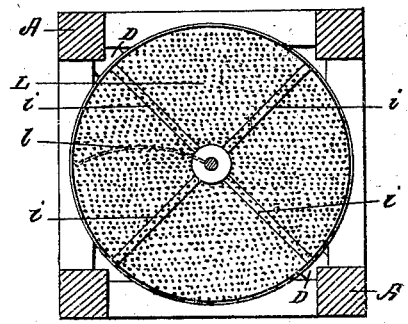

Figure 1, represents a side view of the machine, Fig. 2, represents a vertical section through the same, Fig. 3, represents a view from the top, and Fig. 4, represents one of the screens underneath the brushes.

Similar letters in the several figures represent the same parts.

The nature of my invention consists in so arranging a bolting machine, as that it shall perform all the functions of cooling, bolting and bran-dusting, in one continuous operation, and thus avoid the necessity of three distinct and separate machines, and merely occupy the space usually alloted to the most compact bolting machines.

To enable others skilled in the art to make and use my invention I will proceed to describe the same with reference to the drawings.

On a suitably constructed frame A, I arrange three bridge-trees B, C, D, in the upper and middle of which B, C, are arranged and supported the axis or shaft of a screw E, which passes through the hopper-boy F, and is rotated by a belt from any of the moving parts of the mill, passing around the pulley G, on the shaft of said screw. There are also on said shaft, two arms $a$, $a$, to which are attached by cords $c$, $c$, the two ends of the scraper H, which is provided with oblique arms $d$, for stirring up, and working the flour to the center of the hopper-boy, so that it may pass down, to the first of the series of graduated screens below it. The screw in the hopper-boy, is for working the meal through, when it is too full to be operated upon by the scraper, for the scraper will rise to the top of the meal in such case, the cords $c$, $c$, admitting of such effect.

From the middle to the lower bridge trees C, D, extends a shaft I, which is properly supported in steps in said bridge trees; and near the bottom of the shaft may be a drum or pulley J, for passing a belt around, to give it motion. On the shaft I, are arranged a series of brushes K, which are attached to, and rotate with said shaft, and are made adjustable by the set screws $e$, Fig. 2, (one of which is only shown) so that as they are worn away, they may be let down on the shaft, so as to touch the perforated, or wire gauze disks L (more distinctly seen in Fig. 4). The brushes K, are arranged each one in a separate chamber, and work immediately over the bolting disk L, through which the finer qualities of the meal are brushed or forced; the coarser material passing out of the chambers, through proper openings therein, as seen at $f$, Figs. 1 and 2. The chambers, in which the brushes revolve horizontally, are supported on cross beams forming a part of the frame, and remain fixed or stationary. The bran is taken out in the first; the first middlings in the second; and the second middlings in the third chambers; the fine and superfine flour escapes through the openings $g$, $g$, in the bottom of the lower chamber. The bolting disks are provided with furrows $i$, $i$, for carrying out the coarser material to the periphery of the chambers where it is taken off. Underneath the bolting disks, and between it and the bottom of the chamber, is left a space $k$, through which sweeps a curved arm $l$, for drawing the meal toward the pipe which carries it down to the chambers below, and by this means passing it through the series of graduated bolting screens. The bottom of the chamber $k$ may if deemed necessary be somewhat inclined to expedite the collecting and transmission of the meal through the machine.

Having thus fully described my invention, what I claim therein as new and desire to secure by Letters Patent is—

In combination with a series of graduated stationary bolting disks in separate chambers, the rotating brushes placed above said disks, and the sweeps in a chamber below them, for the purpose of separating the bran, first and second middlings, and the flour, and conveying the meal, &c., through the machine, and for avoiding the use of a bran duster, the whole being arranged in the manner and for the purpose herein fully set forth.

SAMUEL COOK.

Witnesses:
A. B. STOUGHTON,
S. C. DONN.